United States Patent [19]

Jackson, Jr. et al.

[11] Patent Number: 5,356,666
[45] Date of Patent: Oct. 18, 1994

[54] PROCESS FOR REDUCING THE FLAMMABILITY OF ARAMIDS

[75] Inventors: Charles E. Jackson, Jr., New Castle, Del.; Robert V. Kasowski, West Chester, Pa.; Kiu-Seung Lee, Richmond, Va.

[73] Assignee: E. I. du Pont de Nemours and Company, Wilmington, Del.

[21] Appl. No.: 28,671

[22] Filed: Mar. 9, 1993

[51] Int. Cl.$^5$ ............................................. B05D 1/00
[52] U.S. Cl. .................. 427/307; 427/126.1; 427/331; 427/430.1
[58] Field of Search ................ 427/126.1, 430.1, 307, 427/331

[56] References Cited

U.S. PATENT DOCUMENTS

| | | | |
|---|---|---|---|
| 4,217,409 | 8/1980 | Inoue | 430/346 |
| 4,967,548 | 11/1990 | Famgeat | 428/372 |
| 5,167,876 | 12/1992 | Lem | 428/911 |

OTHER PUBLICATIONS

Pat. application Ser. No. 07/974,194, filed 11/10/92.

*Primary Examiner*—Shrive Beck
*Assistant Examiner*—Vi Duong Dang
*Attorney, Agent, or Firm*—Susan B. Evans

[57] ABSTRACT

Disclosed herein is a process for reducing the flammability of aramids by contacting a solvent swollen or never dried aramid with an aqueous solution of a tungsten compound, removing the solvent from, and then drying the aramid. The resulting aramids have superior Limiting Oxygen Indices, making them particularly useful where lower flammability is desired, as in firefighters' overcoats.

16 Claims, No Drawings

PROCESS FOR REDUCING THE FLAMMABILITY OF ARAMIDS

BACKGROUND OF THE INVENTION

This invention relates to a process for reducing the flammability of aramid articles by contacting an aramid article swollen by a solvent or in a "never dried" state with an aqueous solution of a tungsten compound. The aramid article is then dried.

Aramids are polyamides which are derived from aromatic (di)acids and aromatic (di)amines. Many of these polymers are known to possess flammability resistance, together with other useful physical properties, such as high strength, high temperature resistance, and good abrasion resistance. Such properties are found in articles made of these polymers which are useful in areas where high temperatures and/or fire are present. For instance, fibers of such polymers are used in firefighter's coats for protection. Thus any improvement in flammability resistance in aramids is useful.

SUMMARY OF THE INVENTION

This invention concerns a process for reducing the flammability of aramid articles, which comprises contacting an aqueous solution of a tungsten compound with an article of a solvent swollen aramid or a never dried aramid to introduce an amount of tungsten in the article sufficient to reduce flammability and then drying the article.

DETAILS OF THE INVENTION

One measure of the flammability of a substance is the Limiting Oxygen Index (LOI). This test determines the minimum percentage of oxygen needed in the atmosphere to sustain burning of a material. The higher the LOI, the less flammable the tested material is.

In the process herein, a swollen aramid or a never dried aramid is contacted with an aqueous solution of a tungsten compound. A swollen aramid means a polymer swollen with a solvent and/or a solution of an aramid in a solvent. Typically such a solution will have a high enough viscosity so that upon contact with the aqueous solution, the aramid maintains the approximate shape of the solution at the time of contact.

A "never dried" aramid means an aramid coagulated from a solution by contact with a nonsolvent (usually an aqueous bath of some sort, such as water or an aqueous solution). When contacted with the nonsolvent, the polymer coagulates and most of the solvent is removed from the aramid. The aramid has an open sponge-like structure, which usually contains about 150-200% by weight of the aramid of nonsolvent (again, usually water). It is this open sponge-like structure, which has imbibed the nonsolvent, which is referred to herein as "never dried aramid".

Many aramids are used in the form of fibers and films. Fibers may be formed by wet spinning of an aramid solution, while films may be formed by casting a thin layer of the aramid solution. In both cases, the aramid solution (or as it is termed herein solvent swollen aramid) is usually contacted with a nonsolvent such as water, which removes the solvent swelling the aramid and hence coagulates the aramid into a solid polymer, for example as a fiber or film. Hence in this type of process the water is often called a coagulant. A convenient method of contacting the solvent swollen aramid with an aqueous solution of a tungsten compound, is the use of an aqueous tungsten containing solution as the coagulant in the process of forming fibers and films. Another convenient method of contacting the aramid with an aqueous tungsten solution is to contact the never dried aramid with the aqueous tungsten solution.

The aramid is then dried to produce the final article (fiber or film). Drying is typically done by the removal of excess water and aramid solvent mechanically, and then the removal of the residual water and solvent by vaporization, as by heating. Typical wet fiber spinning procedures for aramids are known to the art skilled and are described in H. Mark, et al., Ed., Encyclopedia of Polymer Science and Technology, Vol. 6, John Wiley & Sons, New York, 1986, p. 802-839, which is hereby included by reference.

Aramids particularly useful herein include poly(p-phenyleneterephthalamide), and poly(m-phenyleneisophthalamide) because of their already proven utility in fibers for fire resistant applications.

Any tungsten compound which can form a stable aqueous solution may be used herein. Compounds which help solublize the tungsten compound may also be added to the aqueous solution. Useful tungsten compounds include $WCl_4$ (with citric acid to stabilize the solution), heteropolytungstates such as phosphotungstic acids, and isopoly tungstates such as ammonium tungstate and sodium tungstate. Any tungsten compound may be used so long as it is soluble in water, and does not precipitate during operation of the process (see below). Preferred tungsten compounds are phosphotungstic acids and ammonium metatungstate.

Some aramids such as poly(m-phenyleneisophthalamide) are soluble in organic solvents that are essentially neutral (acid-base wise) in aqueous solution, while other aramids, such as p-phenyleneterephthalamide, are usually dissolved in strong acids such as sulfuric acid. For aramids dissolved in neutral organic solvents, ammonium tungstate is a preferred tungsten compound. For aramids dissolved in strong acids, phosphotungstic acids are preferred tungsten compounds. Thus, it is necessary to use a tungsten compound which will not precipitate when its aqueous solution is contacted with the solvent swollen aramid.

The concentration of the tungsten compound in aqueous solution, the temperature and the contact time between the aqueous tungsten solution and the solvent swelled aramid are not critical provided an effective amount of tungsten is introduced into the aramid article. Tungsten concentrations (measured as tungsten metal) of about 1% or more by weight in the aqueous solution are preferred. The temperature at which the process is carried out is limited mostly by the temperature range in which water is a liquid. A convenient temperature range is about 25° C. to about 110° C., preferably 25° C. to 100° C. The preferred contact time between the aqueous tungsten solution and the solvent swelled aramid is one or two seconds to less than an hour. The thicker the solvent swollen aramid is, the longer the contact time.

All of the above variables can be adjusted so that the final amount of tungsten in the aramid (measured as elemental tungsten) is preferably about 0.1 to about 25% by weight. Thus lengthening the contact time, raising the tungsten concentration in the aqueous solution, and using thinner solvent swollen aramid crossections will result in higher tungsten content in the aramid, and higher LOIs.

In the Examples, the following abbreviations are used:
DMAC—N,N-dimethylacetamide
LOI—limiting oxygen index
MPI—poly(m-phenylene isophthalamide)
PPT—poly(p-phenylene terephthalamide)

In the following Examples, the tungsten content was measured using inductive coupled plasma-atomic emission spectroscopy, as described in ASTM procedure Cl111-88. LOIs were measured using ASTM D2863-77.

In the following Examples, when films were made on glass plates, the film became detached from the plate on first exposure to liquid water or an aqueous solution. All films were dried on pin frames to prevent excess shrinkage. For Examples 3-13, MPI controls (contain no tungsten) were LOIs of 28.2 and 27.0, while for PPT controls gave LOI values of 27.2-27.5.

EXAMPLE 1

A 5% aqueous solution of ammonium metatungstate was prepared by adding 10 g of ammonium metatungstate to 190 g of water and heated at about 60° C. until complete solution was obtained. Five g of never dried MPI fiber (moisture content 155%) was added to the ammonium tungstate solution held at 60° C. After 30 min the fiber was removed and dried at 120° C. in an oven for 1 hr. The LOI of the fiber was 39.7. A similar fiber not treated with the ammonium tungstate solution had an LOI of 28.0.

EXAMPLE 2

Using the same procedure as in Example 1, a sample of never dried PPT fiber was contacted with an ammonium tungstate solution. This fiber had an LOI of 31.7. A control PPT fiber that was not treated with the ammonium tungstate solution had an LOI of 27.0.

EXAMPLE 3

A solution of 20% PPT in 100.5% sulfuric acid (0.5% $SO_3$) was cast in a dry box on a glass plate maintained at 90° C. using a 0.13 mm wet film applicator. The film (with the glass plate) was placed in a 5% aqueous solution of phosphotungstic acid (Fisher Scientific Co. No. A-248) maintained at a temperature of 100° C. for a period of 45 min. The film was then washed with a stream Of water for 15 min, soaked in a 0.1 M NaOH solution for 4 hr, and then washed again with water for 15 min. The film was dried in a vacuum oven overnight at 100° C. The film had an LOI of 45.4, and contained 13.4% tungsten and 0.26% phosphorus.

EXAMPLE 4

A solution of 20% PPT in 100.5% sulfuric acid (0.5% $SO_3$) was cast in a dry box on a glass plate maintained at 90° C. using a 0.13 mm wet film applicator. The film (with the glass plate) was dipped into water to (mostly) remove the sulfuric acid and coagulate the polymer. The film was placed in a 5% aqueous solution of phosphotungstic acid (Fisher Scientific Co. No. A-248) maintained at a temperature of 100° C. for 45 min. The film was then washed with a stream of water for 15 min, soaked in a 0.1M NaOH solution for 4 hr, and then washed again with water for 15 min. The film was dried in a vacuum oven overnight at 100° C. The film had an LOI of 44.0, and contained 8.42% tungsten and 0.17% phosphorus.

EXAMPLE 5

A solution containing 20% MPI, 9% $CaCl_2$ and 71% DMAC was cast on a glass plate using a 0.13 mm wet film applicator. The glass plate was heated on a hot plate at 97° C. for 30 rain to remove some of the DMAC sufficient to form a film which could be handled. The film was placed in a 5% aqueous solution of phosphotungstic acid (Fisher Scientific Co. No. A-248), maintained at a temperature of 100° C., for 45 rain. The film was dried in a vacuum oven overnight at 100° C. The film had an LOI of 47.8, and contained 21.6% tungsten, 0.39% phosphorus, and 0.62% calcium.

EXAMPLES 6-13

In these Examples, the procedures of Examples 3, 4 or 5 were used. In all of these Examples, the concentration of the tungsten compound in aqueous solution was 5%. See Table I for conditions and results.

TABLE I

| Ex. No. | Procedure of Ex. No. | Aramid | Tungsten Compound | LOI | % W | % Ca |
|---|---|---|---|---|---|---|
| 6 | 5 | MPI | Ammonium metatungstate | 41.5 | — | — |
| 7 | 5 | MPI | Sodium metatungstate | 38.0 | — | — |
| 8 | 5 | MPI | $WCl_4{}^a$ | 40.9 | 2.33 | 0.16 |
| 9 | 4 | PPT | Ammonium metatungstate | 35.1 | — | — |
| 10 | 4 | PPT | Sodium metatungstate | 29.0 | 0.78 | — |
| 11 | 4 | PPT | $WCl_4{}^a$ | 33.9 | — | — |
| 12 | 3 | PPT | Ammonium metatungstate | 36.1 | — | — |
| 13 | 3 | PPT | $WCl_4{}^a$ | 29.8 | — | — |

$^a$Solution also contains 12% citric acid

What is claimed is:

1. A process for reducing the flammability of an aramid article, which comprises, contacting an aqueous solution of a tungsten compound with an article of a solvent swollen aramid or a never dried aramid to introduce an amount of tungsten in the article sufficient to reduce its flammability and then drying the article.

2. The process as recited in claim 1 wherein the aramid is poly(p-phenyleneterephthalamide) or poly-(m-phenyleneisophthalamide).

3. The process as recited in claim 1 wherein the aramid is the never dried aramid.

4. The process as recited in claim 2 wherein the aramid is the never dried aramid.

5. The process as recited in claim 1 wherein the aramid is the solvent swollen aramid.

6. The process as recited in claim 1 wherein the tungsten compound is a heteropolytungstate, isopoly tungstate or $WCl_4$.

7. The process as recited in claim 1 wherein the tungsten compound is a phosphotungstic acid or ammonium tungstate.

8. The process as recited in claim 1 wherein the tungsten compound is a isopoly tungstate and the aramid is poly(m-phenyleneisophthalamide).

9. The process as recited in claim 8 wherein the tungsten compound is ammonium tungstate.

10. The process as recited in claim 1 wherein the aramid is poly(p-phenyleneterephthalamide) and the tungsten compound is a phosphotungstic acid.

11. The process as recited in claim 1 wherein the process is carried out at a temperature of about 25° C. to about 100° C.

12. The process as recited in claim 1 wherein the aqueous solution is a coagulant in a fiber spinning process.

13. The process as recited in claim 1 wherein the aqueous solution is a coagulant in a film forming process.

14. The process as recited in claim 1 wherein the aqueous solution contains about one percent or more by weight of tungsten in solution.

15. The process as recited in claim 12 wherein the aramid is the never dried aramid.

16. A process for reducing the flammability of an aramid article, which comprises, contacting an aqueous solution of $WCl_4$, wherein the aqueous solution is a coagulant in a film forming process, with an article of a poly(m-phenyleneisophthalamide) wherein the process is carried out at a temperature of 100° C., to introduce an amount of tungsten in the article sufficient to reduce its flammability and then drying the article.

* * * * *